United States Patent Office 2,737,300
Patented Mar. 6, 1956

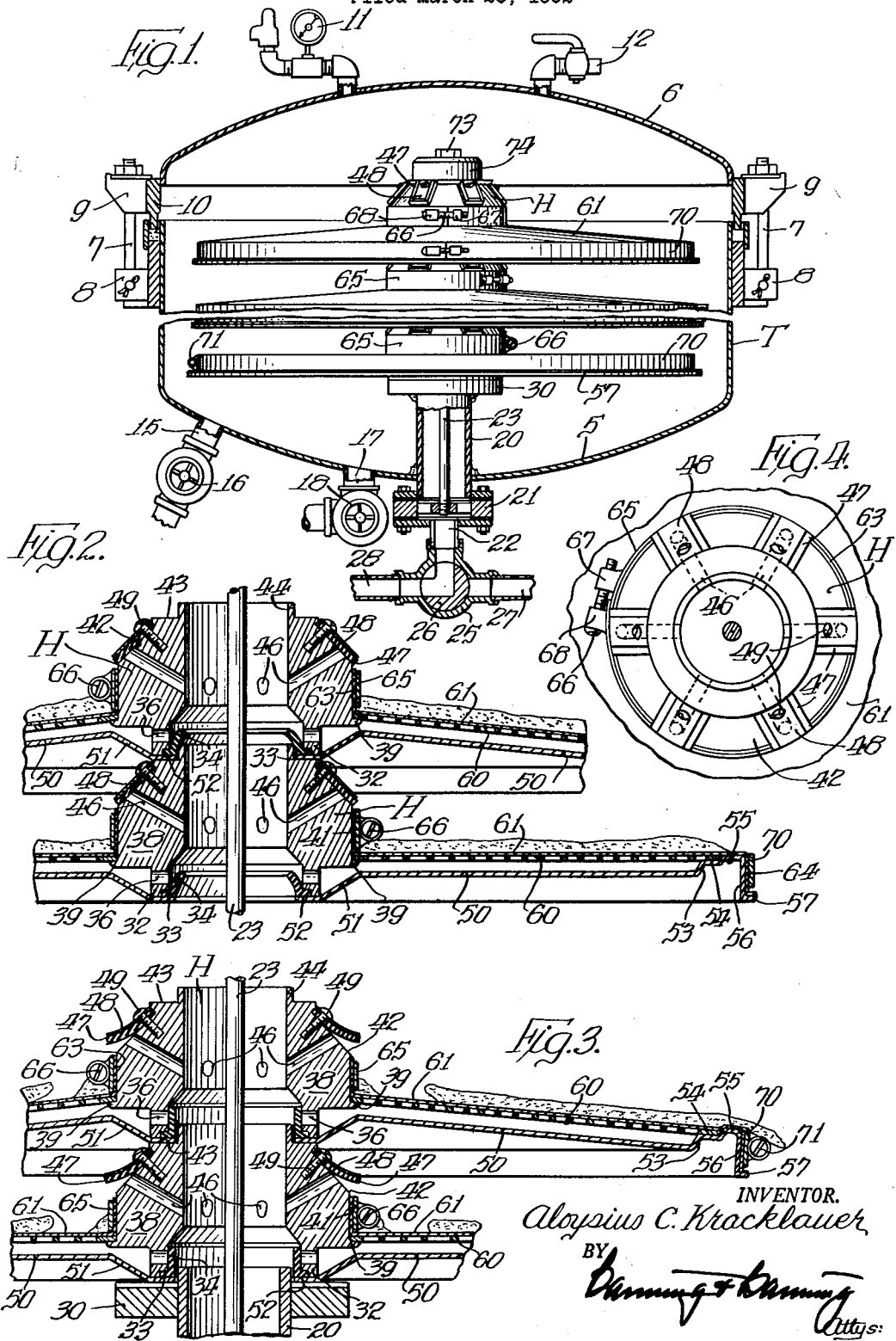

2,737,300

WASH-OFF PLATE FILTER APPARATUS

Aloysius C. Kracklauer, Mundelein, Ill.

Application March 26, 1952, Serial No. 278,687

7 Claims. (Cl. 210—185)

This invention relates to a filter apparatus of the type in which a plurality of horizontal filter units is assembled into a tier within a cylindrical tank, with provision for liquid to circulate through the filtering media of each unit and into a hollow central column for gravity outflow therethrough. The present filter apparatus is designed primarily for industrial use, and is effective for the clarification of various liquids and for the separation of solid particles contained in liquid vehicles which may be of many different kinds—acids, oils, syrups, wines, and varnishes, being examples.

The features of improvement which characterize the present filter are concerned primarily with means whereby accumulated sediment on the filter units may be periodically washed off for removal through a drain outlet in the tank. For this purpose I utilize a system of valved ports which operate to direct the circulatory flow through one path when liquid is being filtered, and through another path when the liquid is reversely flowed for wash-off purposes. But one set of valved ports are in use at a time. The means thus provided for directing a reverse flow of the liquid through a second path is simple and inexpensive, and involves no decrease in the capacity of the filter when in normal operation.

These and other objects of my invention as will hereinafter appear may be realized from a filter apparatus when constructed in accordance with the accompanying drawing wherein is shown a preferred embodiment of the invention in the manner following:

Figure 1 is a central vertical section taken through the filter apparatus in its entirety, showing in full the assembled filter units and part of the apparatus on which the units are supported;

Fig. 2 is an enlarged fragmentary detail in vertical section of two adjacent filter units, the check valves incorporated therein being shown in the positions which they occupy during a normal filtering operation;

Fig. 3 which is a similar view shows the check valves moved to opposite positions as when the liquid is reversely flowed to effect a wash-off of accumulated sediment from the filter units; and Fig. 4 is a fragmentary top plan view of the central portion of one of the filter units, showing the arrangement of valves for the upper set of ports.

In the illustrated filter apparatus there is a cylindrical tank T suitably mounted on supports (not shown) to sustain at a desired elevation its bottom 5 which is inclined downwardly toward the center. A removable dome top 6 which provides a closure for the tank is shown as secured in place by bolts 7 pivoted to lugs 8 which are affixed to the tank sides for engagement with yokes 9 that outstand from a band 10 depending from the top. A pressure registering gauge 11 is mounted on the top, as shown, and also a valve-controlled vent 12. Such a construction is common at the present time and needs no further description.

Entering through the bottom 5 is an inlet 15 controlled by a valve 16. Also provided in the bottom is a special drain outlet 17 equipped with a controlling valve 18. A normal discharge opening is located centrally of the bottom at a point of lowest elevation. Through this opening is extended an axial tube 20 which is fixedly anchored to the bottom 5. At the lower end of this tube is a spider ring assembly 21 from which depends a conduit 22. The spider ring assembly is maintained in fluid-tight connection with the axial tube 20 by a tie bolt 23 which extends axially upwardly through a hollow vertical column that will presently be described. The lower end portion of this tie bolt is provided with screw threads for adjustable connection with the spider ring assembly.

The conduit 22 is connected at its lower end with the body 25 of a three-way valve 26. Inlet and outlet pipes 27 and 28 are also joined with the body of this valve, the former in connection with a supply of fresh water or other cleansing liquid. In the position of Fig. 1 the valve 26 establishes communication between the conduit 22 and the drain pipe 28, but with rotation of the valve plug clockwise through 90° the drain pipe will be shut off while communication is established with the supply pipe 27. Liquid is then admissible through the valve 26 for passage into the tube 20 to enter into the tank T via the hollow vertical column.

The construction thus far described is concerned with a tank and the valved connections which provide a normal inlet for liquid to be filtered, a normal outlet through which the filtered liquid may leave the tank, a special valve-controlled drain outlet, and a special valve control whereby liquid may be admitted into the tank through its normal drain outlet to produce a reverse flow therein. There remains to be considered now the tier of filter units which operates within such a tank and which is supported upon a head 30 that is affixed to the tube 20 at its top.

Each filter unit comprises a hub H having an axial passageway which registers with that interiorly of the tube 20 to define therewith the hollow vertical column hereinbefore referred to. Depending from the body of each hub is an annular wall 32 recessed interiorly to provide a seat for reception of the base flange 33 of an annular gasket 34 which is formed of a suitable resilient material, such as rubber or a rubber composition. Through the annular wall 32 is extended a set of radial ports 36 each normally closed at its inner end by the annular gasket 34 (see Fig. 3) which serves as a check valve therefor. The outer end of each port opens out below an enlarged body 38 of the hub whereon is formed a peripheral ledge 39. The hub body is contoured with an outer vertical face 41 and thereabove by an inwardly sloping face 42 which at its top joins with a shoulder 43 that extends outwardly from the base of an upwardly projecting neck 44.

A second set of radial ports 46 is also provided, these ports sloping upwardly through the hub body 38 to open out upon its face 42. Each of these ports establishes communication between the vertical column and the tank exteriorly of the hub. A flap valve 47 is provided at the outer end of each port 46 and, in the form shown, comprises a resilient tongue 47 backed by a thin resilient plate 48, the two being retained in operative assembled relation adjacent their upper margins by a screw fastening means 49 which is removably secured to the hub body. Each flap valve is normally maintained in closed position (see Fig. 2) so that liquid within the tank is prevented from passing inwardly through the ports 46 to enter the hollow vertical column.

Each filter unit also comprises a pair of horizontal, centrally apertured, complementary plates which are spaced apart vertically to provide between them a chamber through which liquid may flow inwardly en route to the ports 36 for discharge into the hollow vertical column. The lowermost plate 50 which is imperforate is inclined downwardly at 51 adjacent its inner margin to provide a downset marginal portion 52 which rests upon the shoulder 43 of the hub H therebelow. In the case of the lowermost filter unit this marginal portion 52 will rest upon a gasket overlying the head 30 (see Fig. 3). Each base plate 50 extends horizontally to a point relatively close to the walls of the tank T. Near its outer periphery the plate 50 is upwardly inclined at 53 to provide an elevated step 54 and thereabove a second step 55 of still higher elevation. A marginal flange 56 which depends from this uppermost step is formed in its lower portion with an outwardly extending lip 57.

The complementary top plate 60 of each filter unit is foraminous, i. e., perforated or otherwise formed with a multitude of openings to permit the free passage of liquid therethrough. Such a plate is utilized to support a filtering media 61 in the form of a sheet of any suitable material, such as paper, fabric, or a non-woven fabric of plastic material having the requisite filtering properties and capacity. The outer marginal portion of each top plate rests upon the step 54 of the complementary base plate 50, and at its inner marginal portion the top plate is supported upon the ledge 39 outstanding from the body of the associated hub H.

The filtering media is of somewhat greater diameter than its supporting top plate 60 so that its innner marginal portion may be upturned at 63 to surround the vertical face 41 of the hub body; likewise the outer marginal portion of the filtering media is downturned at 64 to extend over the exterior face of the depending flange 56 and down close to the lip 57 at its bottom. A split clamping band 65 is fitted around the upwardly extending inner portion of the filtering media and adjusted tightly by rotative manipulation of a bolt 66 which interconnects lugs 67 and 68 that are affixed to the band adjacent its ends. When clamped tightly around the upwardly extending inner marginal portion of the filtering media, the latter will be securely affixed to the hub. A second split band 70, also provided with a similar adjusting bolt 71, is fitted around the outer marginal portion 64 of the filtering media whereby to secure it tightly about the depending flange 56 of the base plate 50.

It will be noted that each filter unit extends away from its supporting hub in a generally horizontal direction. Whether the two complementary plates comprised in each filter unit be exactly level or inclined is relatively unimportant. Two different forms are illustrated by way of example. For all practical purposes they are both horizontally disposed and are so referred to herein. All the filter units comprised in the assembly may be exactly level or inclined, or they may be mixed as herein illustrated.

The tie bolt 23 extends axially through the central column and its upper end is provided with a head 73 which engages the top face of a cap 74 which surmounts the topmost hub H in the tier. When tightened, the tie bolt will place all of the hubs under compression, thereby to establish leak-proof connections therebetween.

In operation, the special drain outlet 17 is closed and the three-way valve 26 is manipulated to open up connection with the drain pipe 28. Liquid to be filtered is admitted through the inlet 15 to fill the tank and then pass through the filtering media of each filter unit to enter the chambered space therewithin and escape inwardly through the valved ports 36 for gravity discharge through the axial tube 20. The pressure under which the liquid enters the tank is effective to deflect the resilient annular gasket 34 inwardly, thereby opening the check valves at the discharge ends of the several ports 36. Foreign or solid matter removed from the liquid in passing through the filtering media remains as a deposit on the top faces thereof, along with some of the filter aid that is used in the operation. Eventually a sufficient cake of sediment will accumulate to require removal.

In the filter apparatus of this invention such a removal involves merely a wash-off operation. It is performed by closing the inlet valve 16, opening the special drain valve 18, and operating the three-way valve 26 to shut off communication with the drain pipe 28 while opening up communication with the supply pipe 27. When done, liquid will then enter into the tank reversely through the tube 20 to ascend within the central tubular column. In this reverse flow the annular check valve 34 shuts off communication through the several ports 36, but the liquid exerts its pressure with effect upon the check valves 47 at the discharge ends of the upper set of radial ports 46 so as to clear a plurality of passageways into the tank. In doing so, the lower end portion of each flap valve swings outwardly so as to provide, in effect, a baffle which deflects and spreads the discharging liquid downwardly and outwardly so as to impinge upon the top face of the filtering media immediately therebelow. As a result the liquid thus discharged acts quickly to dislodge the accumulated sediment and force it outwardly and off the outer periphery of each filter unit for gravity movement to the bottom of the tank where it is flushed out through the special drain outlet 17.

This operation of washing off and disposing of the accumulated sediment involves only a manipulation of the necessary valves as hereinbefore described. The period of shut-down required is reduced to a minimum since there is no opening up of the tank for access to parts interiorly thereof in order that this wash-off operation may be started and quickly completed. When done, the valves are reset at their former positions for assuring operation of the filter which then proceeds without further special attention on the part of the operator.

I claim:

1. In a filter apparatus of the kind which comprises a tank having a valved inlet and a valved outlet at its bottom, the tank mounting interiorly of itself a tier of chambered filter units horizontally disposed and spaced vertically apart by axially chambered hubs which combine to provide a hollow vertical column in communication with the outlet at the tank bottom, the feature of improvement which comprises hubs havings two sets of ports all opening onto the interior of the hollow vertical column, the first set of ports communicating also with the chamber of the associated filter unit and the second set of ports with the interior of the tank at a point above the said filter unit, and normally-closed check valves operatively connected with the several ports, the arrangement being such that when liquid is admitted through the inlet into the tank it will flow through the several filter units and the first set of ports to open the check valves associated with said first set of ports en route to the hollow vertical column and outlet at the tank bottom and, when the flow is reversed by admitting liquid through the outlet, it will ascend within the column and out through the second set of ports to open the check valves associated with said second set of ports and in so doing discharge upon the top face of the filter unit immediately therebelow to wash-off accumulated matter therefrom.

2. In a filter apparatus of the kind which comprises a tank having a valved inlet and a valved outlet at its bottom, the tank mounting interiorly of itself a tier of chambered filter units horizontally disposed and spaced vertically apart by axially chambered hubs which combine to provide a hollow vertical column in communication with the outlet at the tank bottom, the feature of improvement which comprises hubs having two sets of ports all opening on to the interior of the hollow vertical column, the first set of ports communicating also with the chamber of the associated filter unit and the second set of ports with the interior of the tank at a point above the said filter unit, normally-closed check valves operatively connected with the first set of ports operable to open position in response to movement of liquid through the chambered filter units toward the hollow vertical column, and normally-closed check valves operatively connected with the second set of ports comprising resilient baffles inclined outwardly and downwardly at the outward ends of the ports and operable to open position in response to movement of liquid upwardly through the hollow vertical column and outwardly therefrom, the liquid passing the opened resilient baffles being deflected thereby downwardly and outwardly to discharge upon the top face of the filter unit immediately therebelow to wash off accumulated matter therefrom.

3. In a filter apparatus of the kind which comprises a tank having a valved inlet and a valved outlet at its bottom, the tank mounting interiorly of itself a tier of chambered filter units horizontally disposed and spaced vertically apart by axially chambered hubs which combine to provide a hollow vertical column in communication with the outlet at the tank bottom, the feature of improvement which comprises hubs having two sets of ports all opening on to the interior of the hollow vertical column, the first set of ports communicating also with the chamber of the associated filter unit and the second set of ports with the interior of the tank at a point above the said filter unit, normally-closed check valves operatively connected with the first set of ports comprising a resilient ring mounted interiorly of each hub and extending circumferentially past the inward ends of the said ports to provide a closure therefor but operable to open position in response to movement of liquid through the chambered filter units toward the hollow vertical column, and normally-closed check valves operatively connected with the second set of ports, the arrangement being such that liquid when admitted through the inlet into the tank will flow through the several filter units and the first set of ports to open the check valves associated with said first set of ports en route to the hollow vertical column and outlet at the tank bottom and, when the flow is reversed by admitting liquid through the outlet, it will ascend within the column and out through the second set of ports to open the check valves associated with said second set of ports, and in so doing discharge upon the top face of the filter unit immediately therebelow to wash off accumulated matter therefrom.

4. In a filter apparatus of the kind which comprises a tank having a valved inlet and a valved outlet at its bottom, the tank mounting interiorly of itself a tier of chambered filter units horizontally disposed and spaced vertically apart by axially chambered hubs which combine to provide a hollow vertical column in communication with the outlet at the tank bottom, the feature of improvement comprises hubs having which two sets of ports all opening on to the interior of the hollow vertical column, the first set of ports communicating also with the chamber of the associated filter unit and the second set of ports with the interior of the tank at a point above the said filter unit, normally closed check valves disposed at the inward ends of the first set of ports comprising a resilient ring mounted interiorly of each hub and extending continuously circumferentially past the discharge ends of the said ports to provide a closure therefor but operable to open position in response to movement of liquid through the chambered filter units toward the hollow vertical column, and normally closed check valves for the second set of ports comprising resilient baffles inclined outwardly and downwardly at the outward ends of the ports and operable to open position in response to movement of liquid upwardly through the hollow vertical column and outwardly therefrom, the liquid passing the opened resilient baffles being deflected thereby downwardly and outwardly to discharge upon the top face of the filter unit immediately therebelow to wash off accumulated matter therefrom.

5. In a multiple unit stacked filter for substantially horizontal plates in which the filtering medium of each unit has at least one outer surface through which the liquid filtrate passes into the filter chamber of said unit, a hollow shaft on which the units are assembled, means for supplying material to be filtered, means for withdrawing the liquid filtrate through the shaft after filtering, means for supplying wash liquid to the shaft, check valve means in the shaft whereby on supply of wash liquid the wash liquid is prevented from entering the filter chamber of any filter unit and is directed to at least one of said outer surfaces to wash collected solid material therefrom, and means for removing the washings.

6. The filter of claim 5 in which one of said outer surfaces is on the upper side of the filter unit and the wash liquid is directed to said upper surface.

7. The filter of claim 5 in which said withdrawing means includes check valve means adapted to prevent the material to be filtered from bypassing the filter units and discharging directly into the hollow shaft.

References Cited in the file of this patent

UNITED STATES PATENTS

| Re. 14,213 | Sweetland | Nov. 7, 1916 |
| 1,342,829 | Shriver | June 8, 1920 |
| 1,510,568 | Sweetland | Oct. 7, 1924 |
| 1,993,175 | Libbey et al. | Mar. 5, 1935 |
| 2,412,232 | Sutton | Dec. 10, 1946 |
| 2,417,958 | Teale | Mar. 25, 1947 |
| 2,615,574 | Kracklauer | Oct. 28, 1952 |
| 2,651,418 | Prendergast | Sept. 8, 1953 |

FOREIGN PATENTS

| 181,123 | Great Britain | June 8, 1922 |
| 49,245 | Germany | Oct. 24, 1889 |
| 594,953 | Germany | Mar. 23, 1934 |